(12) United States Patent
Leszczynski et al.

(10) Patent No.: US 9,664,067 B2
(45) Date of Patent: May 30, 2017

(54) SEAL RETAINING ASSEMBLY

(71) Applicant: General Electric Company, Schenectady, NY (US)

(72) Inventors: Karol Filip Leszczynski, Warsaw (PL); Christopher Warren Childs, Marietta, GA (US); David Matthew Clarida, Edmond, OK (US); Gregory Allan Crum, Greenville, SC (US); Mitchel Merck, Mount Airy, GA (US); Alexander Maxim Libers, Cumming, GA (US)

(73) Assignee: General Electric Company, Schenectady, NY (US)

( * ) Notice: Subject to any disclaimer, the term of this patent is extended or adjusted under 35 U.S.C. 154(b) by 315 days.

(21) Appl. No.: 14/511,716

(22) Filed: Oct. 10, 2014

(65) Prior Publication Data

US 2016/0102578 A1    Apr. 14, 2016

(51) Int. Cl.
*F16J 15/06* (2006.01)
*F02C 7/28* (2006.01)
*F01D 25/24* (2006.01)
*F01D 11/00* (2006.01)
*F01D 25/26* (2006.01)
*F01D 25/30* (2006.01)
*F16J 15/3268* (2016.01)
*F16J 15/322* (2016.01)

(52) U.S. Cl.
CPC .......... *F01D 25/243* (2013.01); *F01D 11/005* (2013.01); *F01D 25/26* (2013.01); *F01D 25/30* (2013.01); *F01D 25/305* (2013.01); *F02C 7/28* (2013.01); *F16J 15/061* (2013.01); *F16J 15/322* (2013.01); *F16J 15/3268* (2013.01); *F05D 2240/55* (2013.01)

(58) Field of Classification Search
CPC .... F01D 25/243; F01D 11/003; F01D 11/005; F16J 15/061; F16J 15/02; F16J 15/062; F02C 7/28; F05D 2260/30
See application file for complete search history.

(56) References Cited

U.S. PATENT DOCUMENTS 4,248,569 A      2/1981  Thebert
5,176,389 A *    1/1993  Noone ................ F16J 15/3288
                                                       277/355

(Continued)

*Primary Examiner* — Andrew Nguyen
(74) *Attorney, Agent, or Firm* — Ernest G. Cusick; Frank A. Landgraff

(57) ABSTRACT

A seal retaining assembly includes a first segment coupled to a first structure. Also included is a recess of the first segment, the recess defined by a first and second wall, the first wall defining a first wall aperture, the second wall defining a second wall aperture. Further included is a second segment having a tab disposed within the recess in fitted contact with the first and second wall to retain the second segment to the first segment in a radial direction, the tab defining a tab aperture, the first and second segment defining an axial gap therebetween, the first wall aperture, the second wall aperture and the tab aperture are aligned to form a passage. Yet further included is a flex seal within the axial gap. Also included is a pin in the passage to fix the second segment to the first segment in axial and circumferential directions.

16 Claims, 4 Drawing Sheets

(56) References Cited

U.S. PATENT DOCUMENTS

| | | | | |
|---|---|---|---|---|
| 5,224,822 A | * | 7/1993 | Lenahan | C23C 30/00 415/177 |
| 2010/0011780 A1 | * | 1/2010 | Varney | F01D 25/243 60/796 |
| 2011/0127352 A1 | * | 6/2011 | Fachat | F01D 11/001 239/265.15 |
| 2016/0153299 A1 | * | 6/2016 | Tuertscher | F01D 5/14 415/115 |

* cited by examiner

SEAL RETAINING ASSEMBLY

BACKGROUND OF THE INVENTION

The subject matter disclosed herein relates to seal retaining assemblies and, more particularly, to a seal retaining assembly for turbine assemblies, such as a turbine exhaust flex seal retaining assembly.

Turbine systems, such as gas turbine engines, require sealing in numerous locations due to high temperature and pressure operation. The environmental conditions that the seals are subjected to require occasional replacement of the seals. In some instances, the seals are located in regions of the turbine system that are difficult to access and require substantial disassembly procedures. For example, a seal located near the forward axial end, and radially outer region, of an exhaust diffuser disposed within an exhaust frame is fixed in place with a retaining assembly that maintains a flex seal between a diffuser skin and the exhaust frame. Replacement of the flex seal typically requires removal of the exhaust frame, rotor and/or turbine shell. Such a replacement process undesirably causes long and expensive outages for maintenance operations.

BRIEF DESCRIPTION OF THE INVENTION

According to one aspect of the invention, a seal retaining assembly includes a first segment operatively coupled to a first structure. Also included is a recess of the first segment, the recess defined by a first wall and a second wall, the first wall defining a first wall aperture, the second wall defining a second wall aperture. Further included is a second segment having a tab disposed within the recess in fitted contact with the first wall and the second wall to retain the second segment to the first segment in a radial direction, the tab defining a tab aperture, the first segment and the second segment defining an axial gap therebetween, the first wall aperture, the second wall aperture and the tab aperture are aligned to form a passage. Yet further included is a flex seal disposed within the axial gap. Also included is a pin disposed in the passage to fix the second segment to the first segment in an axial direction and in a circumferential direction.

According to another aspect of the invention, a turbine exhaust flex seal retaining assembly includes an aft segment operatively coupled to an exhaust diffuser, the aft segment having an aft portion, a first wall and a second wall each extending axially from the aft portion, and an aft segment arm extending radially from the first wall. Also included is a recess of the aft segment, the recess defined by the first wall and the second wall, the first wall defining a first wall aperture, the second wall defining a second wall aperture. Further included is a forward segment having a main body, a tab extending axially from the main body, and a forward segment arm extending radially from the main body, the tab disposed within the recess and defining a tab aperture, the aft segment arm and the forward segment arm defining an axial gap therebetween, wherein the first wall aperture, the second wall aperture and the tab aperture are aligned to form a passage. Yet further included is a flex seal disposed within the axial gap. Also included is a mechanical fastener disposed in the passage to retain the forward segment to the aft segment in an axial direction and in a circumferential direction.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
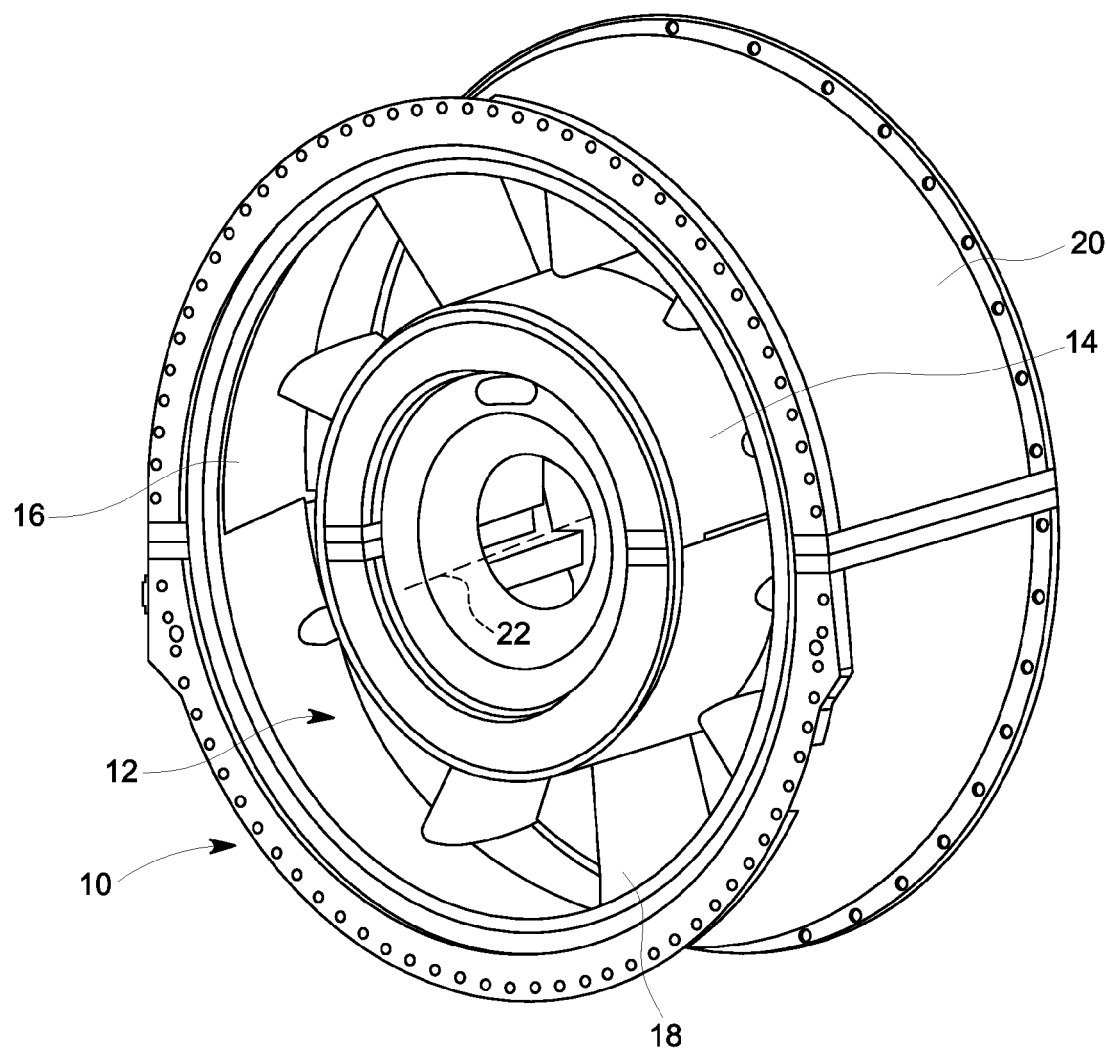
FIG. 1 is a perspective view of a turbine exhaust assembly.

Referring to FIG. 1, illustrated is an exhaust frame 10 that is located downstream of a turbine section (not illustrated) of a gas turbine engine. The exhaust frame 10 houses an exhaust diffuser 12 having an inner barrel 14 and an outer barrel 20 that are structurally coupled with a plurality of struts 18. The outer barrel 20 includes a diffuser skin 16 that refers to an outer portion of the exhaust diffuser 12. The exhaust frame 10 and the exhaust diffuser 12 extend circumferentially around a turbine axis 22. The entire circumference of the exhaust frame 10 and/or the exhaust diffuser 12 may be formed of multiple circumferential segments.

The exhaust diffuser 12, including the diffuser skin 16, is formed of a metal configured to withstand hot gas passing through the exhaust diffuser 12. The exhaust frame 10 located radially outwardly of the diffuser skin 16 is typically formed of carbon steel and an annular channel 24 (FIG. 2) is defined by the diffuser skin 16 and the exhaust frame 10. The annular channel 24 provides space for a cooling flow to be routed for cooling of the exhaust frame 10 and the diffuser skin 16. To prevent leakage of the cooling flow routed within the annular channel 24, sealing is required at a forward axial end of the exhaust frame 10. Although the sealing embodiments described herein are illustrated and described in the context of the above-described annular channel between the exhaust frame 10 and the diffuser skin 16, it is to be appreciated that the embodiments described herein may be advantageously employed in a number of locations of the turbine assembly, including locations within a gas turbine engine or a steam turbine engine.

Figure 2:
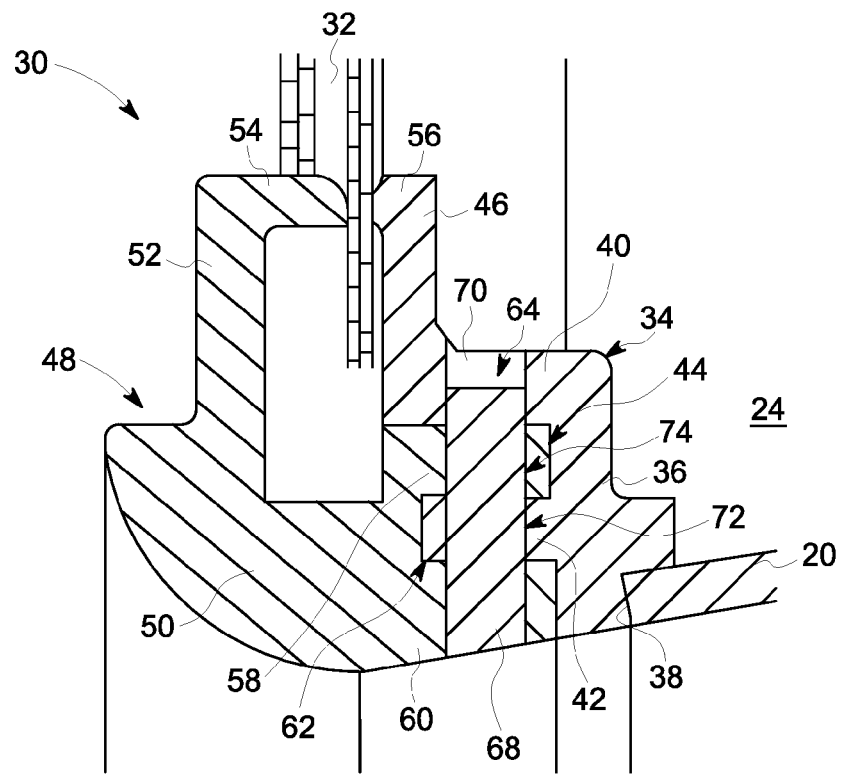
FIG. 2 is a cross-section view of a seal retaining assembly.

Referring now to FIG. 2, a seal retaining assembly 30 is illustrated in detail. The seal retaining assembly 30 is configured to retain a sealing element, such as a flex seal 32. In the illustrated embodiment, the seal retaining assembly 30 is positioned at a forward end of the diffuser skin 16 proximate an inlet of the exhaust diffuser 12. More particularly, the seal retaining assembly 30 is positioned to retain the flex seal 32 within the annular channel 24 to reduce or prevent leakage of cooling flow therein.

The seal retaining assembly 30 includes an aft segment 34 having an aft portion 36 that is operatively coupled to a forward end 38 of the diffuser skin 16. Coupling may be made with mechanical fasteners or by welding. It is to be appreciated that the aft segment 34 may be a single circumferential segment or a plurality of segments that are operatively coupled to each other. In the case of a plurality of segments coupled to each other, any suitable coupling technique may be employed, including welding or mechanical fasteners. For example, four segments may be employed, with each of the four segments extending about 90 degrees around the turbine axis 22 and the circumference of the exhaust frame 10 and diffuser skin 16. Extending forwardly from the aft portion 36 is a first wall 40 and a second wall 42 radially spaced from each other to define a recess 44 therebetween. The first wall 40 and the second wall 42, and therefore the recess 44, extend circumferentially around the turbine axis 22. An aft segment arm 46 extends radially from the first wall 40 in a radially outward direction.

A forward segment 48 of the seal retaining assembly 30 is included and has a main body 50. Extending radially outwardly from the main body 50 is a forward segment arm 52. The flex seal 32 is configured to be disposed between and axially retained by the aft segment arm 46 and the forward segment arm 52, which define a gap therebetween. In particular, the flex seal 32 is in contact with at least one of a portion of the aft segment arm 46 and the forward segment arm 52 and axially fixed therebetween. For example, while the flex seal 32 may be in contact with both the aft segment arm 46 and the forward segment arm 52, it is contemplated that at various times of operation, the flex seal 32 is in contact with only one of the arms. The flex seal 32 may be in contact with only the aft segment arm 46, while the flex seal 32 may be in contact with only the forward segment arm 52 at other times of operation. Startup and shutdown of the gas turbine engine are examples of operating times when contact with a single arm may be made. In the illustrated embodiment, the forward segment arm 52 includes a first contact member 54 extending axially rearward from the forward segment arm 52 and the aft segment arm 46 includes a second contact member 56 extending axially forward from the aft segment arm 46 to provide the gripping interface for contacting the flex seal 32. It is to be understood that the location of contact may vary from that shown. For example, the contact members may be located at alternative radial locations of the respective arms. Furthermore, the axially extending contact members may not be required in an embodiment where the flex seal 32 is in contact with the inner surface of the arms.

The forward segment 48 also includes a tab 58 extending axially rearward from the main body 50. The tab 58 is sized to fit within the recess 44 of the aft segment 34. As shown, an additional tab 60 extends from the main body 50 and is located radially inwardly from the tab 58. The tab 58 and the additional tab 60 define a forward segment recess 62. In assembly, after the aft segment 34 is coupled to the diffuser skin 16, the flex seal 32 is positioned in a manner to be contacted by the aft segment arm 46 and the forward segment arm 52. The forward segment 48 is moved axially rearward to insert the tab 58 into the recess 44 of the aft segment 34 and to receive the second wall 42 into the forward segment recess 62. Upon completion, the forward segment 48 is radially fixed to the aft segment 34 due to insertion of the tab 58 and the second wall 42.

To achieve axial and circumferential fixation of the forward segment 48, a passage 64 is present to receive a mechanical fastener 68 therein. The passage 64 is formed of numerous apertures that are aligned. Specifically, a first wall aperture 70 is defined by the first wall 40, a second wall aperture 72 is defined by the second wall 42, and a tab aperture 74 is defined by the tab 58. Additionally, the additional tab 60 of the forward segment 48 may include an aperture. The apertures are all aligned to collectively form the passage 64, which receives the mechanical fastener 68 to fix the forward segment 48 to the aft segment 34 in both axial and circumferential directions. The mechanical fastener 68 may be any suitable member, such as a pin, dowel, bolt or the like. Irrespective of the precise type of fastener, the mechanical fastener 68 is disposed in tight, fitted contact with the walls defining the passage 64. The mechanical fastener 68 may be welded or staked (e.g., heat staked) to the walls.

Figure 6:
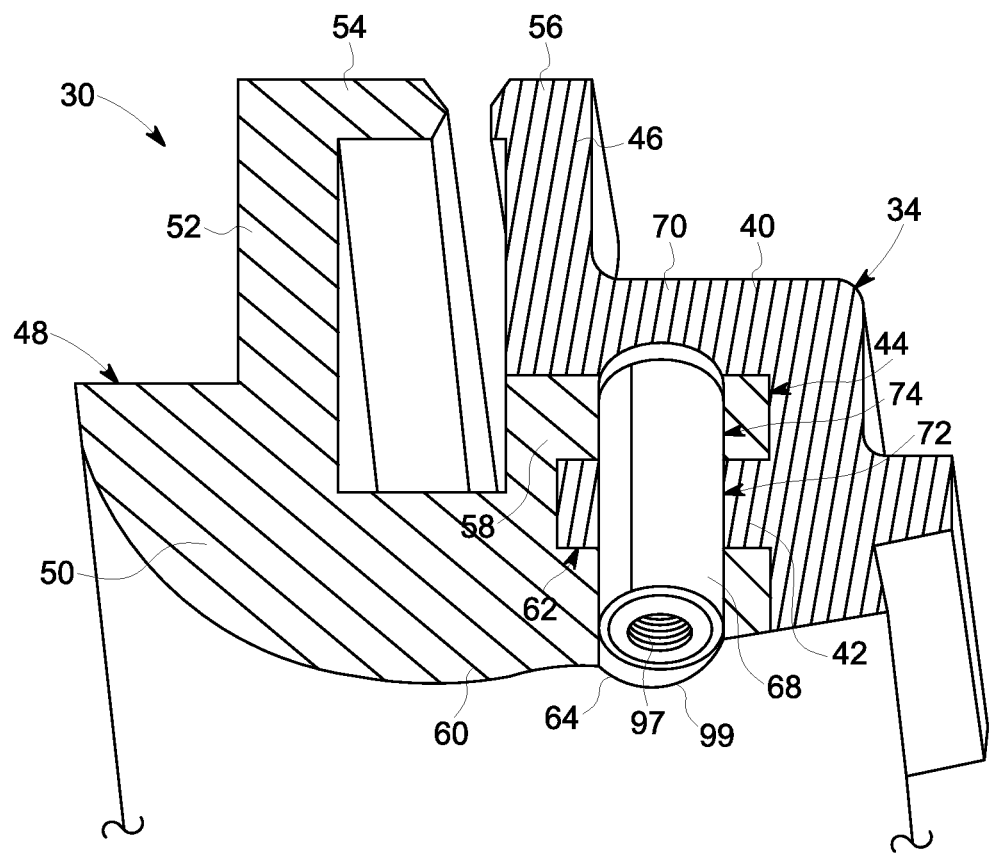
FIG. 6 is a perspective, cross-sectional view of the seal retaining assembly according to an embodiment.

It is to be appreciated that the passage 64 may be defined by more or less aperture walls. For example, as shown in FIG. 6, the first wall 40 does not contain an aperture, such that the mechanical fastener 68 is inserted from a radially inner end 99 of the passage 64. In this embodiment, the passage 64 has a closed end at a radially outer end.

In any of the embodiments of FIGS. 2-6, a pin removal element 97 (FIG. 6) may be machined into or coupled to the mechanical fastener 68 to facilitate insertion and/or removal of the mechanical fastener 68. As shown, the pin removal element 97 may be a threaded portion or any element that is conducive to providing a coupling interface for an operator or a tool.

Figure 3:
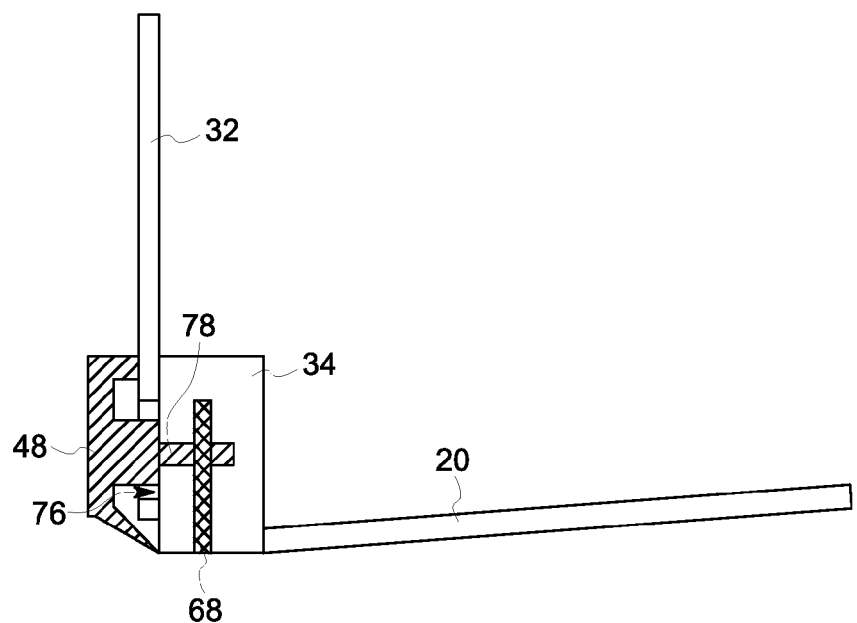
FIG. 3 is cross-sectional view of the seal retaining assembly according to another embodiment.
Figure 4:
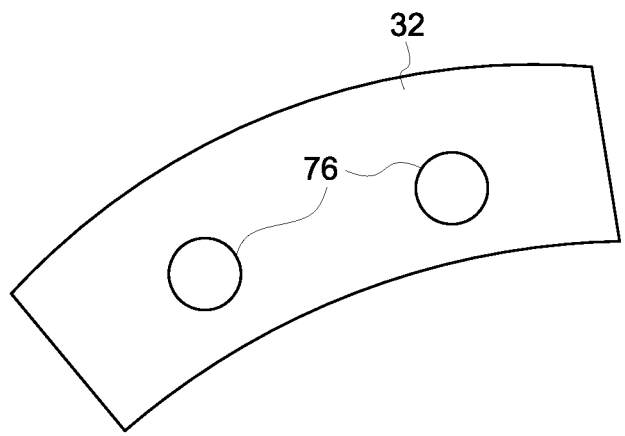
FIG. 4 is an elevation view of a portion of a flex seal ring retained by the seal retaining assembly.
Figure 5:
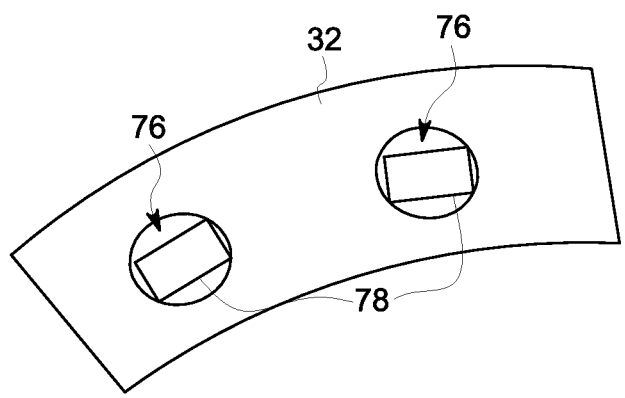
FIG. 5 is an elevation view of a segment of the seal retaining assembly having tabs extending through the flex seal ring.

Referring now to FIGS. 3-5, an alternative embodiment of the seal retaining assembly 30 is illustrated. In the illustrated embodiment, the flex seal 32 is gripped by the forward segment 48 and the aft segment 34, but extends downwardly into the axial gap between the forward segment 48 and the aft segment 34 to a sufficient depth to assist with alignment of the apertures configured to receive the mechanical fastener 68. In particular, the flex seal 32 includes at least one, but typically a plurality of holes 76 circumferentially spaced from each other. The plurality of holes 76 provide alignment keys for a plurality of circumferentially spaced tabs 78 extending from the forward segment 48. Upon insertion of the plurality of circumferentially spaced tabs 78, the passage 64 is aligned properly to receive the mechanical fastener 68.

Advantageously, the embodiments of the seal retaining assembly 30 described herein avoids the need for disassembly and removal of various turbine system components, such as the exhaust frame 10, a turbine shell, and a rotor, for example. Additionally, significant cutting and/or welding windows is avoided by simply grinding out the welds present in the above-described system. This facilitates in-situ replacement or repair of the flex seal 32 without the risk of cutting and welding windows that may cause turbine damage.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A seal retaining assembly comprising:
   a first segment operatively coupled to a first structure;
   a recess of the first segment, the recess defined by a first wall and a second wall, the first wall defining a first wall aperture, the second wall defining a second wall aperture;
   a second segment having a tab disposed within the recess in fitted contact with the first wall and the second wall to retain the second segment to the first segment in a radial direction, the tab defining a tab aperture, the first segment and the second segment defining an axial gap therebetween, the first wall aperture, the second wall aperture and the tab aperture are aligned to form a passage;
   a flex seal disposed within the axial gap; and
   a pin disposed in the passage to fix the second segment to the first segment in an axial direction and in a circumferential direction,
   wherein the flex seal defines a hole, the tab extending through the hole to align the tab aperture with the first wall aperture and the second wall aperture.

2. The seal retaining assembly of claim 1, wherein the first segment extends circumferentially around an axis.

3. The seal retaining assembly of claim 1, wherein the first segment comprises a plurality of circumferential segments each extending around a portion of a circumference of the first structure.

4. The seal retaining assembly of claim 3, wherein the plurality of circumferential segments comprises four segments each extending 90 degrees around the circumference of the first structure.

5. The seal retaining assembly of claim 3, wherein each of the plurality of circumferential segments are welded to each other.

6. The seal retaining assembly of claim 1, wherein the first segment is welded to the first structure.

7. The seal retaining assembly of claim 1, wherein the seal retaining assembly is disposed in an exhaust assembly of a gas turbine engine, the first structure comprising a diffuser skin located proximate a forward end of an exhaust frame.

8. A turbine exhaust flex seal retaining assembly comprising:
   an aft segment operatively coupled to an exhaust diffuser, the aft segment having an aft portion, a first wall and a second wall each extending axially from the aft portion, and an aft segment arm extending radially from the first wall;
   a recess of the aft segment, the recess defined by the first wall and the second wall, the first wall defining a first wall aperture, the second wall defining a second wall aperture;
   a forward segment having a main body, a tab extending axially from the main body, and a forward segment arm extending radially from the main body, the tab disposed within the recess and defining a tab aperture, the aft segment arm and the forward segment arm defining an axial gap therebetween, wherein the first wall aperture, the second wall aperture and the tab aperture are aligned to form a passage;
   a flex seal disposed within the axial gap; and
   a mechanical fastener disposed in the passage to retain the forward segment to the aft segment in an axial direction and in a circumferential direction,
   wherein the flex seal defines a hole, the tab extending through the hole to align the tab aperture with the first wall aperture and the second wall aperture.

9. The turbine exhaust flex seal retaining assembly of claim 8, wherein the aft segment comprises a plurality of circumferential segments each extending around a portion of a circumference of the exhaust diffuser.

10. The turbine exhaust flex seal retaining assembly of claim 9, wherein the plurality of circumferential segments comprises four segments each extending 90 degrees around the circumference of the exhaust diffuser.

11. The turbine exhaust flex seal retaining assembly of claim 9, wherein each of the plurality of circumferential segments are welded to each other.

12. The turbine exhaust flex seal retaining assembly of claim 8, wherein the aft segment is welded to a diffuser skin of the exhaust diffuser.

13. The turbine exhaust flex seal retaining assembly of claim 8, wherein the mechanical fastener is welded to an inner wall defining the passage.

14. The turbine exhaust flex seal retaining assembly of claim 8, wherein the tab retains the forward segment to the aft segment in a radial direction.

15. The turbine exhaust flex seal retaining assembly of claim 8, wherein the mechanical fastener comprises a pin.

16. The turbine exhaust flex seal retaining assembly of claim 8, wherein the mechanical fastener comprises a bolt.

* * * * *